US012647698B2

(12) United States Patent
Muto

(10) Patent No.: US 12,647,698 B2
(45) Date of Patent: Jun. 2, 2026

(54) TIME TO DIGITAL CONVERTER, DISTANCE MEASURING DEVICE, AND MOVING BODY

(71) Applicant: CANON KABUSHIKI KAISHA, Tokyo (JP)

(72) Inventor: Hiroyuki Muto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 86 days.

(21) Appl. No.: 18/897,441

(22) Filed: Sep. 26, 2024

(65) Prior Publication Data

US 2025/0119665 A1     Apr. 10, 2025

(30) Foreign Application Priority Data

Oct. 4, 2023     (JP) ................................. 2023-173156

(51) Int. Cl.
| *H04N 25/772* | (2023.01) |
| *H04N 23/56* | (2023.01) |
| *H04N 25/47* | (2023.01) |
| *H04N 25/705* | (2023.01) |
| *H04N 25/76* | (2023.01) |
| *H04N 25/773* | (2023.01) |

(52) U.S. Cl.
CPC ........... *H04N 25/772* (2023.01); *H04N 23/56* (2023.01); *H04N 25/47* (2023.01); *H04N 25/705* (2023.01); *H04N 25/7795* (2023.01)

(58) Field of Classification Search
CPC ........ G04F 10/005; G04F 10/04; G04F 10/00; H04N 25/772; H04N 23/56; H04N 25/47; H04N 25/705; H04N 25/7795; H04N 25/773
See application file for complete search history.

(56) References Cited

U.S. PATENT DOCUMENTS

| 11,320,792 B2 * | 5/2022 | Sudo | ..................... | G04F 10/005 |
| 11,526,136 B2 * | 12/2022 | Lee | ........................ | H03L 7/085 |

(Continued)

FOREIGN PATENT DOCUMENTS

| JP | H09-64858 A | 3/1997 |
| JP | 2012-39386 A | 2/2012 |

(Continued)

OTHER PUBLICATIONS

U.S. Appl. No. 18/890,995, filed Sep. 20, 2024 by Wataru Endo.

*Primary Examiner* — Ahmed A Berhan
(74) *Attorney, Agent, or Firm* — VENABLE LLP

(57) ABSTRACT

A time to digital conversion circuit includes a pulse signal generator configured to generate a pulse signal in response to activation of a transition detection signal, a latch circuit configured to latch a multiphase clock signal in response to a trailing edge of the pulse signal, an upper time to digital converter (TDC) configured to latch, in response to activation of a timing signal, a code whose value changes at the same period as a period of the multiphase clock signal, and a synchronization circuit. The latch circuit forms a lower TDC. The synchronization circuit supplies a signal synchronized by receiving the transition detection signal at a timing decided in accordance with a signal generated by the lower TDC as the timing signal to the upper TDC.

16 Claims, 16 Drawing Sheets

(56)  References Cited

U.S. PATENT DOCUMENTS

| | | | |
|---|---|---|---|
| 11,606,514 B2 | 3/2023 | Muto | |
| 12,422,784 B2 * | 9/2025 | Kuo ..................... | G04F 10/005 |
| 2013/0146751 A1 | 6/2013 | Hagihara | |
| 2021/0373502 A1 | 12/2021 | Sudo et al. | |

FOREIGN PATENT DOCUMENTS

| | | | |
|---|---|---|---|
| JP | 2021-27496 A | 2/2021 |
| WO | 2013/34770 A2 | 3/2013 |

* cited by examiner

F I G. 3
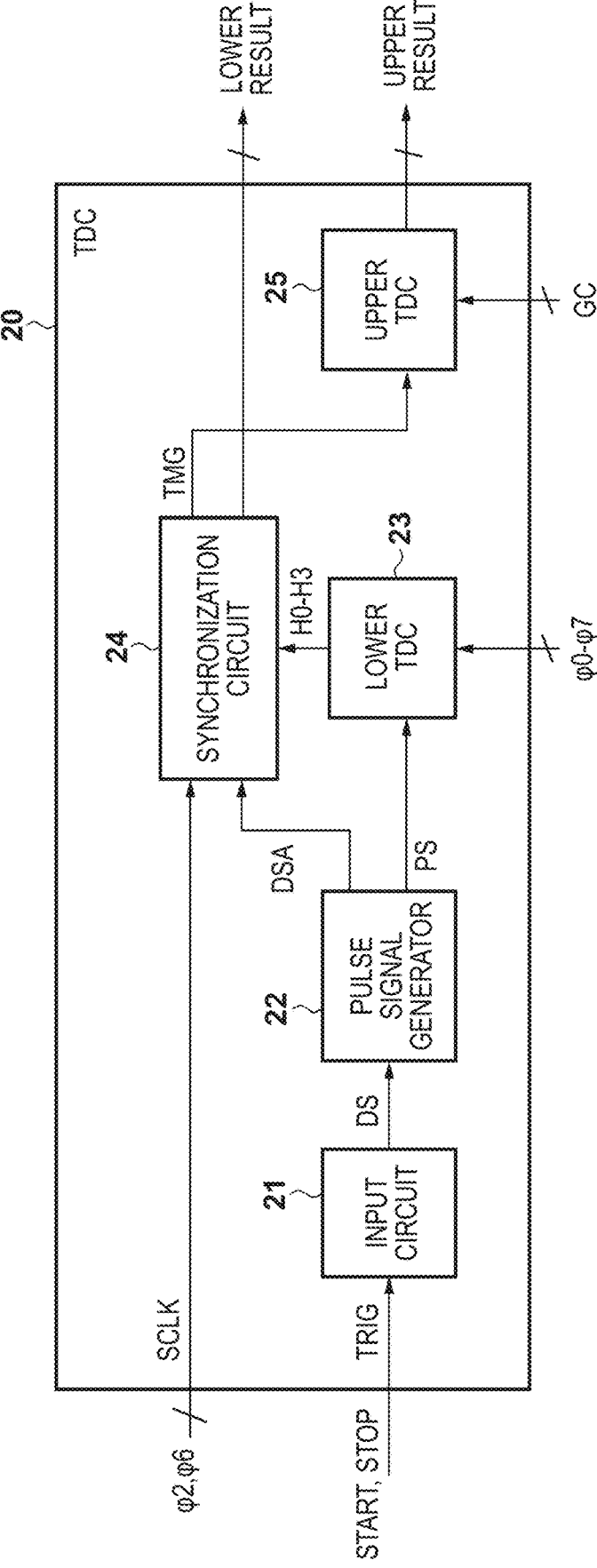

FIG. 4

F I G. 5
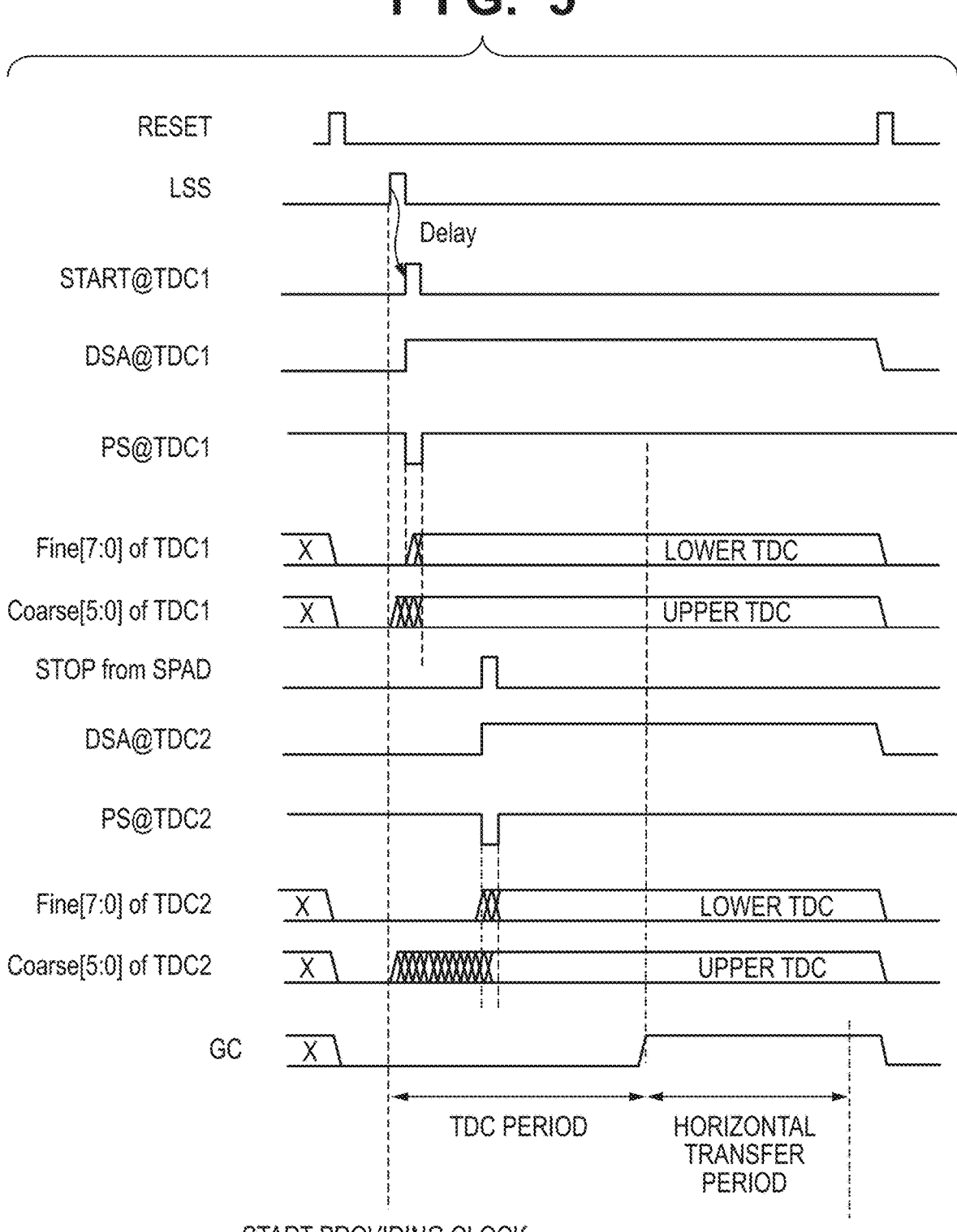

START

LSS

RESET

SM

302

START CONTROL
CIRCUIT

22

223

221

DSA

Vdd

21

222

TRIG

DS

PS

RESET

INPUT CIRCUIT

PULSE SIGNAL GENERATOR

F I G. 11
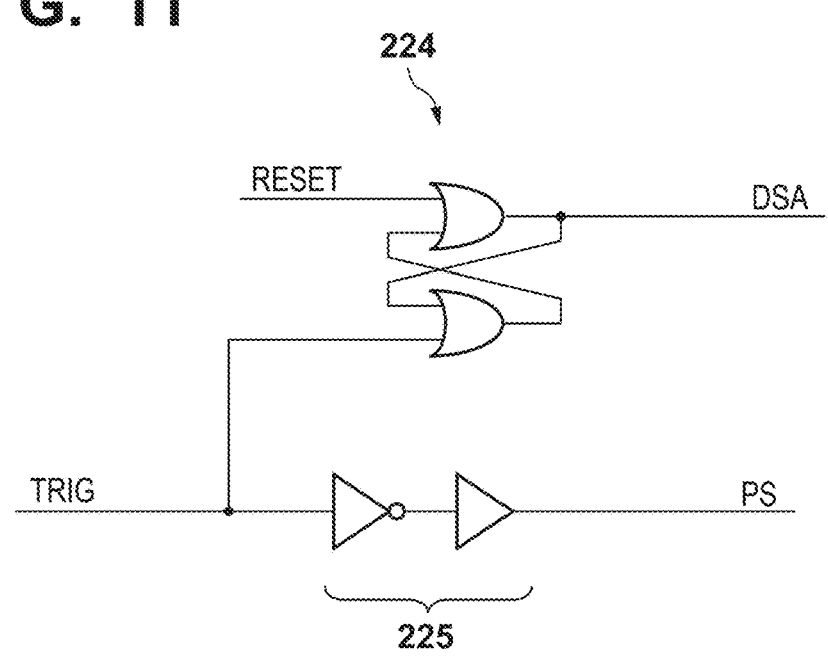
F I G. 12
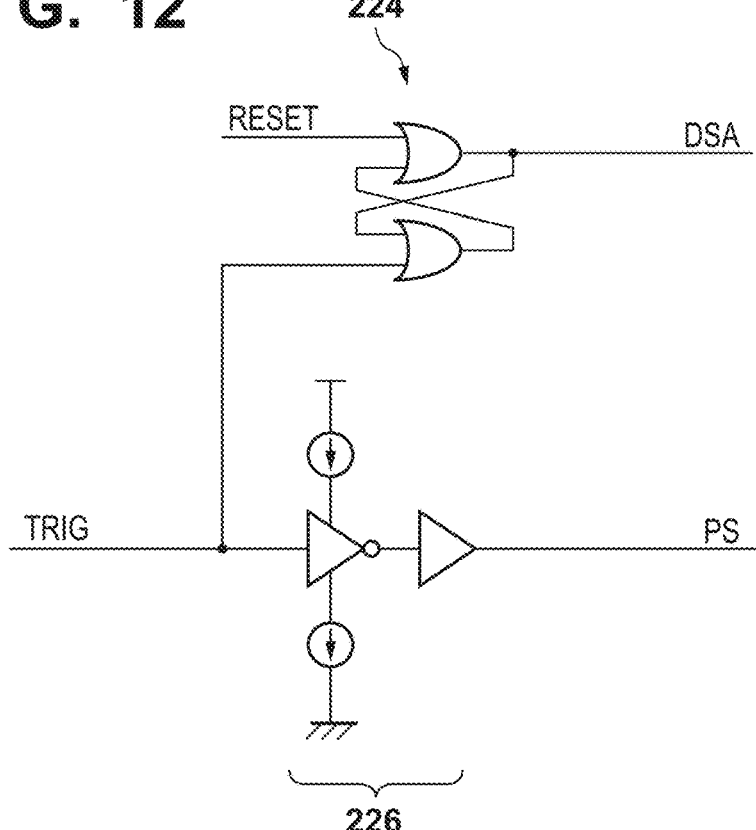

F I G. 13

F I G. 14

F I G. 15
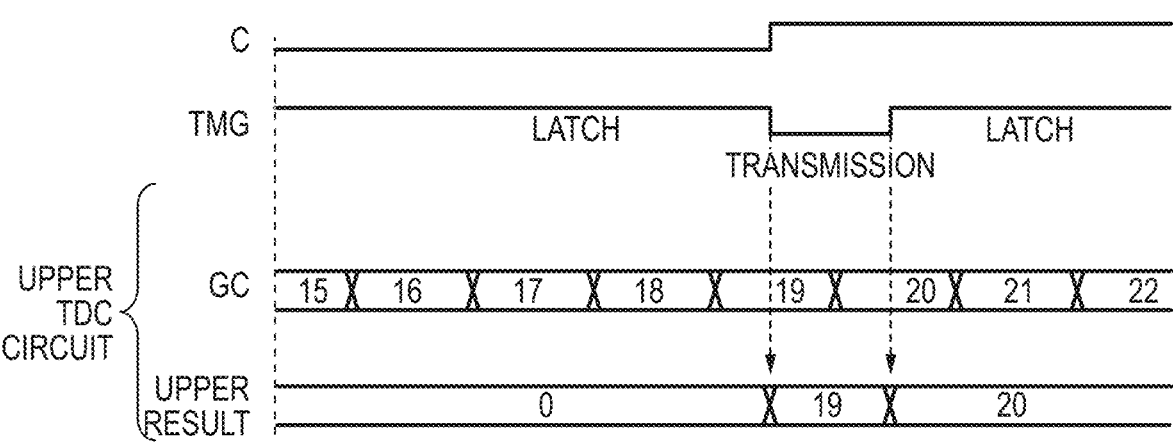
F I G. 16
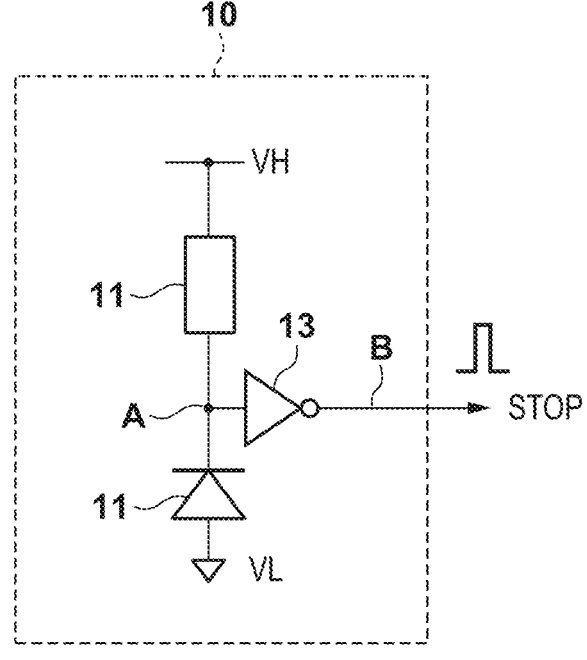

F I G. 17
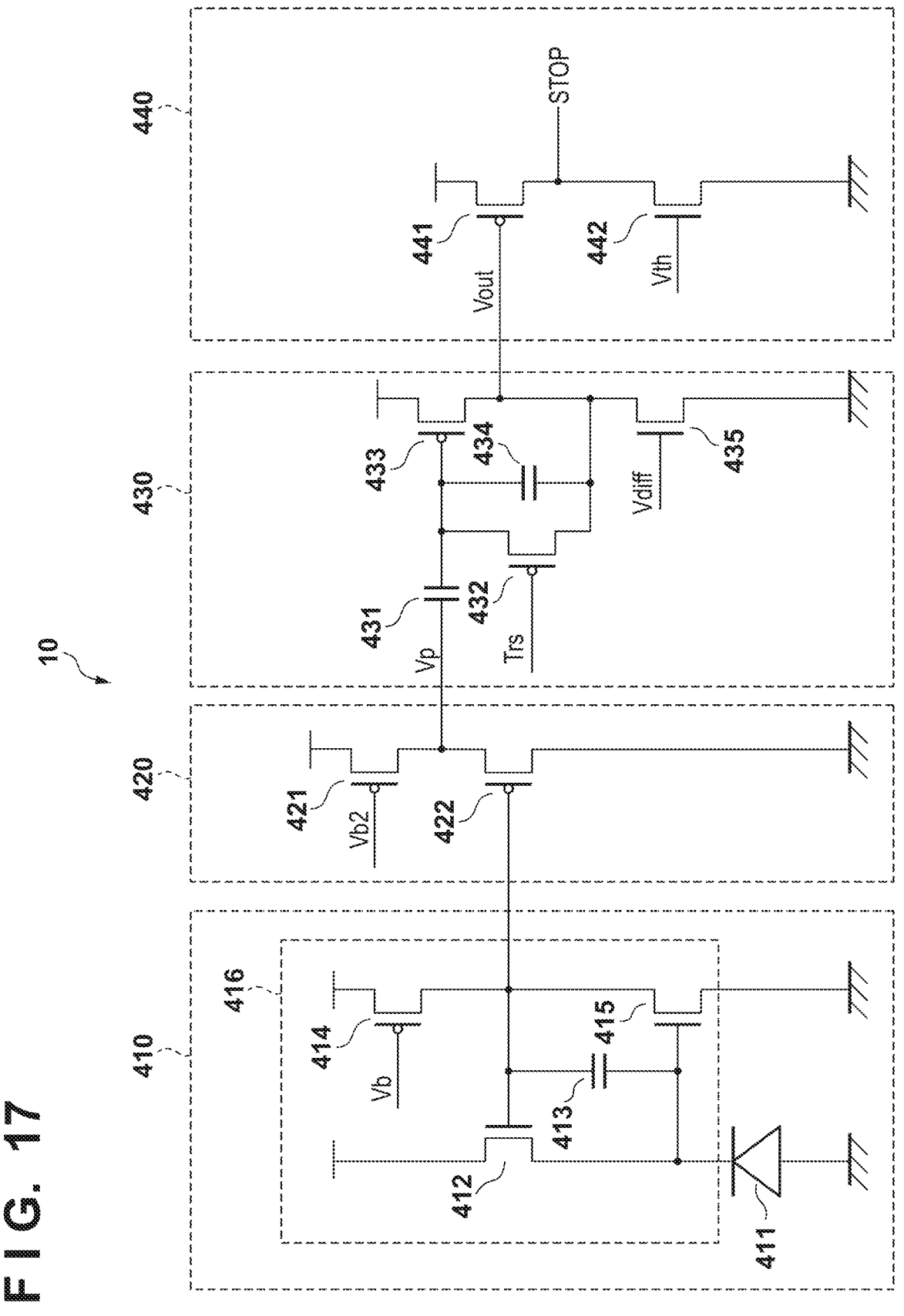

F I G. 18
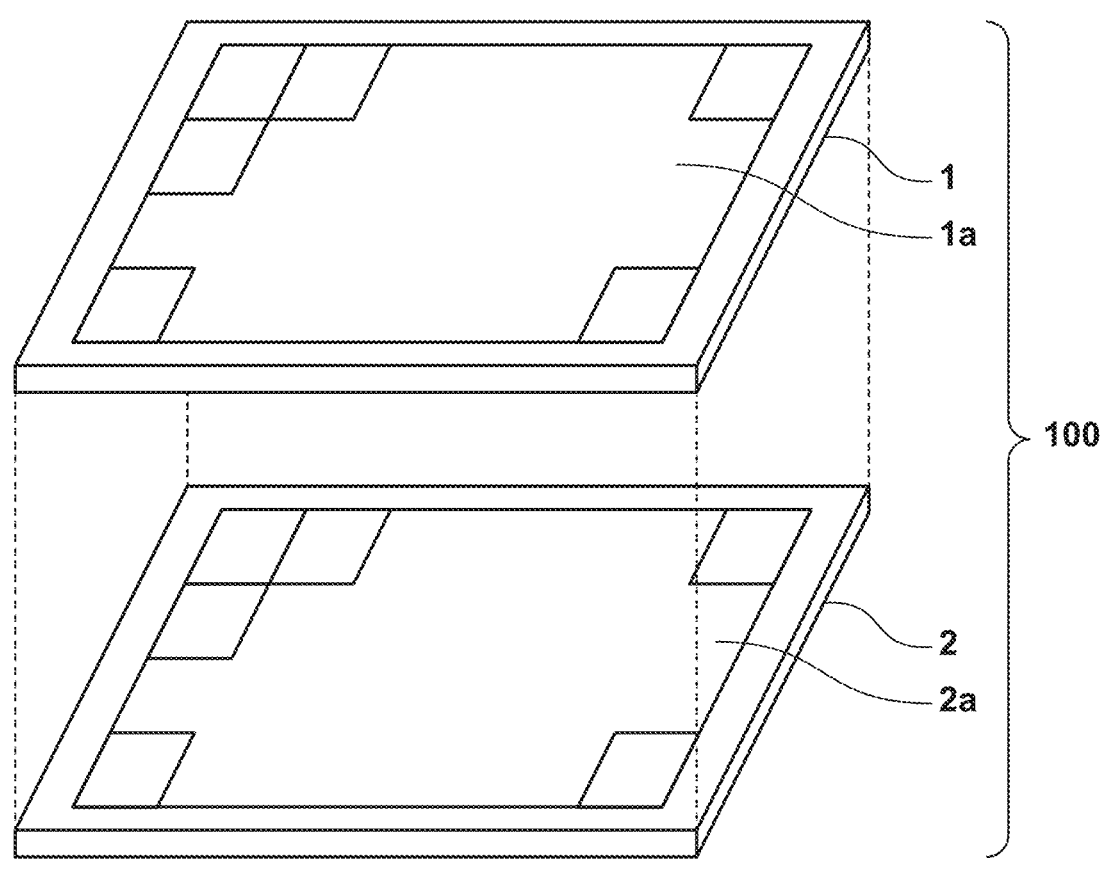

TIME TO DIGITAL CONVERTER, DISTANCE MEASURING DEVICE, AND MOVING BODY

BACKGROUND OF THE INVENTION

Field of the Invention

The present disclosure relates to a time to digital converter, a distance measuring device, and a moving body.

Description of the Related Art

In recent years, a time to digital converter (TDC) that converts time into a digital signal is applied in various fields. A time to digital converter described in International Publication No. 2013/034770 (patent literature 1) is applied to a sensor capable of capturing a three-dimensional (3D) distance image, and measures the time of flight of a photon detected by a Single Photon Avalanche Diode (SPAD) pixel. Also, the time to digital converter in patent literature 1 includes an upper (coarse) TDC and a lower (fine) TDC.

SUMMARY OF THE INVENTION

According to one aspect of the present disclosure, there is provided a time to digital conversion circuit comprising: a pulse signal generator configured to generate a pulse signal in response to activation of a transition detection signal; a latch circuit configured to latch a multiphase clock signal in response to a trailing edge of the pulse signal; an upper time to digital converter (TDC) configured to latch, in response to activation of a timing signal, a code whose value changes at the same period as a period of the multiphase clock signal; and a synchronization circuit, wherein the latch circuit forms a lower TDC, and the synchronization circuit supplies a signal synchronized by receiving the transition detection signal at a timing decided in accordance with a signal generated by the lower TDC as the timing signal to the upper TDC.

Further features of the present invention will become apparent from the following description of exemplary embodiments with reference to the attached drawings.

BRIEF DESCRIPTION OF THE DRAWINGS

FIG. 1 is a view showing the configuration of a distance measuring device according to an embodiment;

FIG. 2 is a view showing the configuration of a distance image sensor according to the embodiment;

FIG. 3 is a view showing an example of the configuration of a measurement block according to the embodiment, which can be used as a first measurement block and a second measurement block;

FIG. 4 is a circuit diagram showing a more detailed example of the configuration of the measurement block according to the embodiment;

FIG. 5 is a timing chart showing an example of the operation of the measurement block according to the embodiment;

FIG. 8 is a view showing the configuration of a measurement block according to the comparative example;

FIG. 11 is a circuit diagram showing the second modification of the input circuit and the pulse signal generation circuit in the measurement block according to the embodiment;

FIG. 12 is a circuit diagram showing the third modification of the input circuit and the pulse signal generation circuit in the measurement block according to the embodiment;

FIG. 13 is a circuit diagram showing the first improved example of the measurement block according to the embodiment;

FIG. 14 is a circuit diagram showing the second improved example of the measurement block according to the embodiment;

FIG. 15 is a timing chart showing the operations of a synchronization circuit and an upper TDC in the measurement block shown in FIG. 14;

FIG. 16 is a circuit diagram showing an example of the configuration of a pixel;

FIG. 17 is a circuit diagram showing another example of the configuration of the pixel;

FIG. 18 is a view showing the configuration of the distance image sensor; and

DESCRIPTION OF THE EMBODIMENTS

Figure 6:
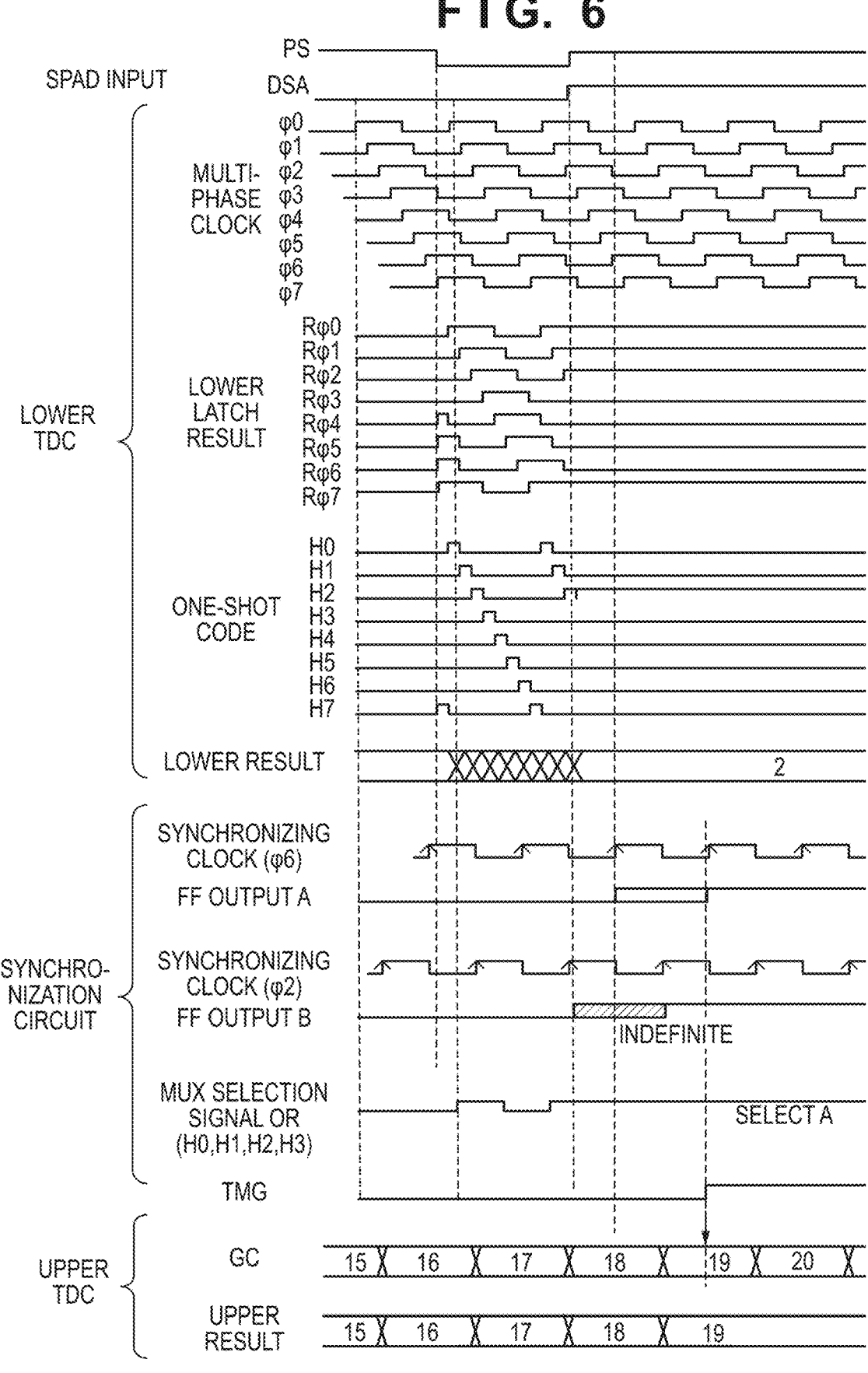
FIG. 6 is a timing chart showing an example of the operation of the measurement block according to the embodiment.

The present disclosers made the following examination.

For example, a TDC can start time measurement and then end the time measurement in response to a trigger signal such as a stop signal. The measurement of time can be performed by latching a multiphase clock signal by a latch circuit in response to activation of the trigger signal. The latch circuit can be formed by, for example, a D latch. During a period when the trigger signal is in the active state (a period when the latch circuit is in a transmission state), the multiphase clock signal that toggles at a high speed toggles a logic gate group forming the latch circuit. When the trigger signal is inactivated, the input stage (for example, a transfer gate) of the latch circuit blocks signal transmission to a holding circuit (for example, an SR latch) at the subsequent stage, and the state of the holding circuit is fixed. Hence, during a period when the trigger signal is in the inactive state, the power consumption of the latch circuit is small. However, during a period for waiting for transition of the trigger signal from the active state to the inactive state, the power consumption of the latch circuit may be non-negligible. Also, lowering of a power supply voltage caused by the power consumption may lower the time measurement accuracy.

The present disclosure relates to a technique advantageous in reducing the power consumption of a latch circuit in a time to digital converter.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Figure 1:
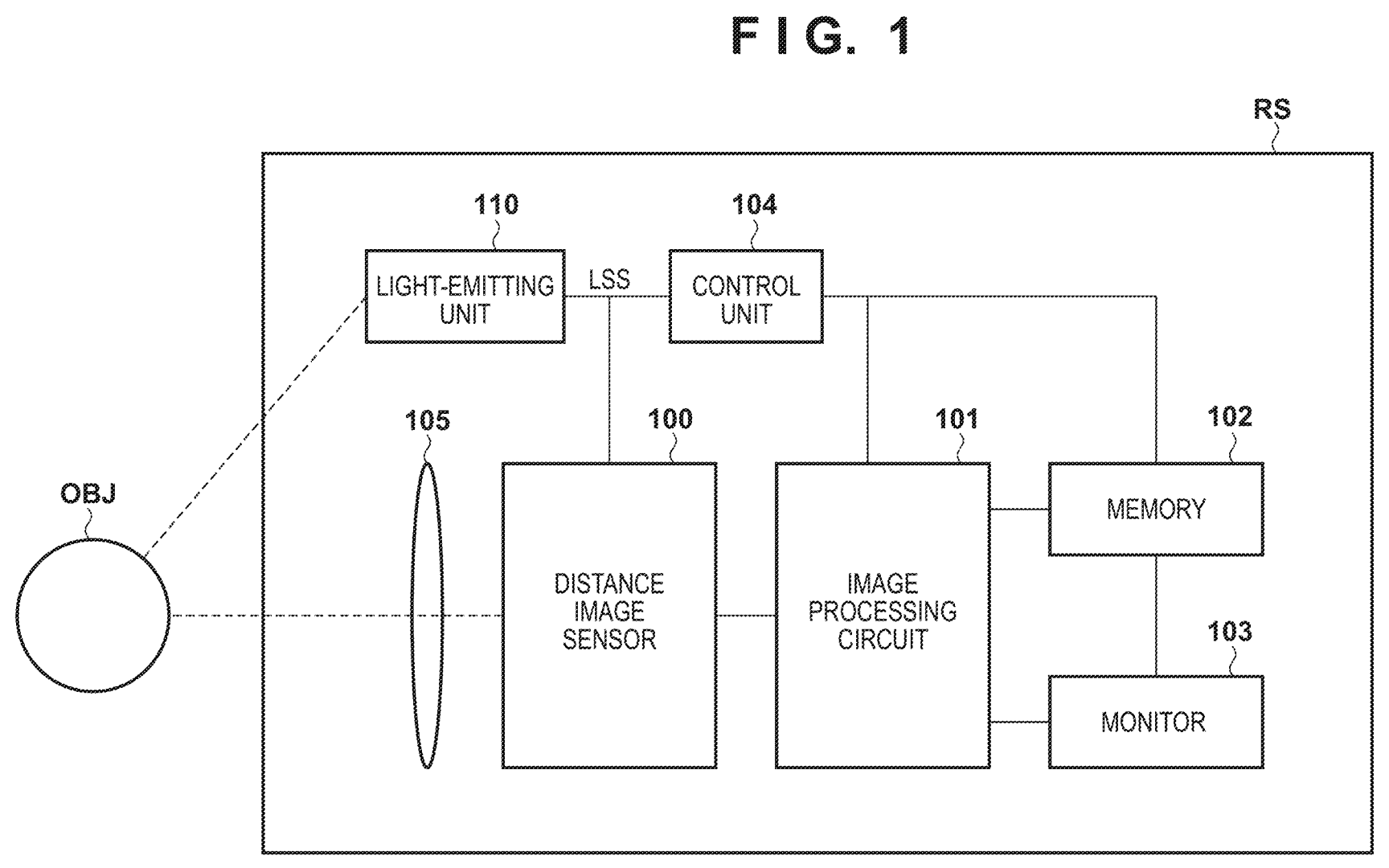

FIG. 1 is a view showing the configuration of a distance measuring device RS according to an embodiment. The distance measuring device RS can be configured as, for example, a distance image generation device that generates a distance image. The distance measuring device RS measures the distance from the distance measuring device RS to an object OBJ based on the time of flight (TOF) of light. The distance measuring device RS can include, for example, a light-emitting unit 110, an optical system 105, a distance image sensor 100, an image processing circuit 101, a memory 102, a monitor 103, and a control unit 104. Note that a description will be made here assuming that the distance measuring device RS includes the distance image sensor 100 as one of a plurality of constituent elements, but the distance image sensor 100 may be understood as the distance measuring device. That is, the distance image sensor 100 can be understood as the minimum constituent element of the distance measuring device RS.

The control unit 104 controls the light-emitting unit 110, the optical system 105, the distance image sensor 100, the image processing circuit 101, the memory 102, and the monitor 103. The control unit 104 can be configured to send a synchronization signal LSS to the light-emitting unit 110 and (a time to digital conversion circuit in) the distance image sensor 100. Sending the synchronization signal LSS is synonymous with activating the synchronization signal LSS. The synchronization signal LSS is a signal that instructs the light-emitting unit 110 to emit light.

The light-emitting unit 110 emits pulse light such as a laser beam in response to the synchronization signal LSS. If some kind of object OBJ exists in an area irradiated with the pulse light, the pulse light can be reflected by the object OBJ and enter the optical system 105. The optical system 105 forms an optical image of the object OBJ by the incident pulse light on the pixel array of the distance image sensor 100. The distance image sensor 100 can include a pixel array including a plurality of pixels forming the pixel array, and a time to digital conversion circuit that converts time from reception of the synchronization signal LSS to reception of a stop signal output from each of the plurality of pixels of the pixel array into a digital signal. The pixel is preferably, for example, an avalanche photodiode, particularly, a Single Photon Avalanche Diode (SPAD) that receives a single photon, but it may be a pixel of another type, for example, an event detection type pixel. The image processing circuit 101 can generate a distance image including distance information to the object OBJ based on the signal output from a time to digital converter and the known speed of light. The generated distance image can be output to the memory 102 and the monitor 103. The memory 102 stores the distance image, and the monitor 103 displays the distance image. The image processing circuit 101 may be incorporated in the distance image sensor 100.

Figure 2:
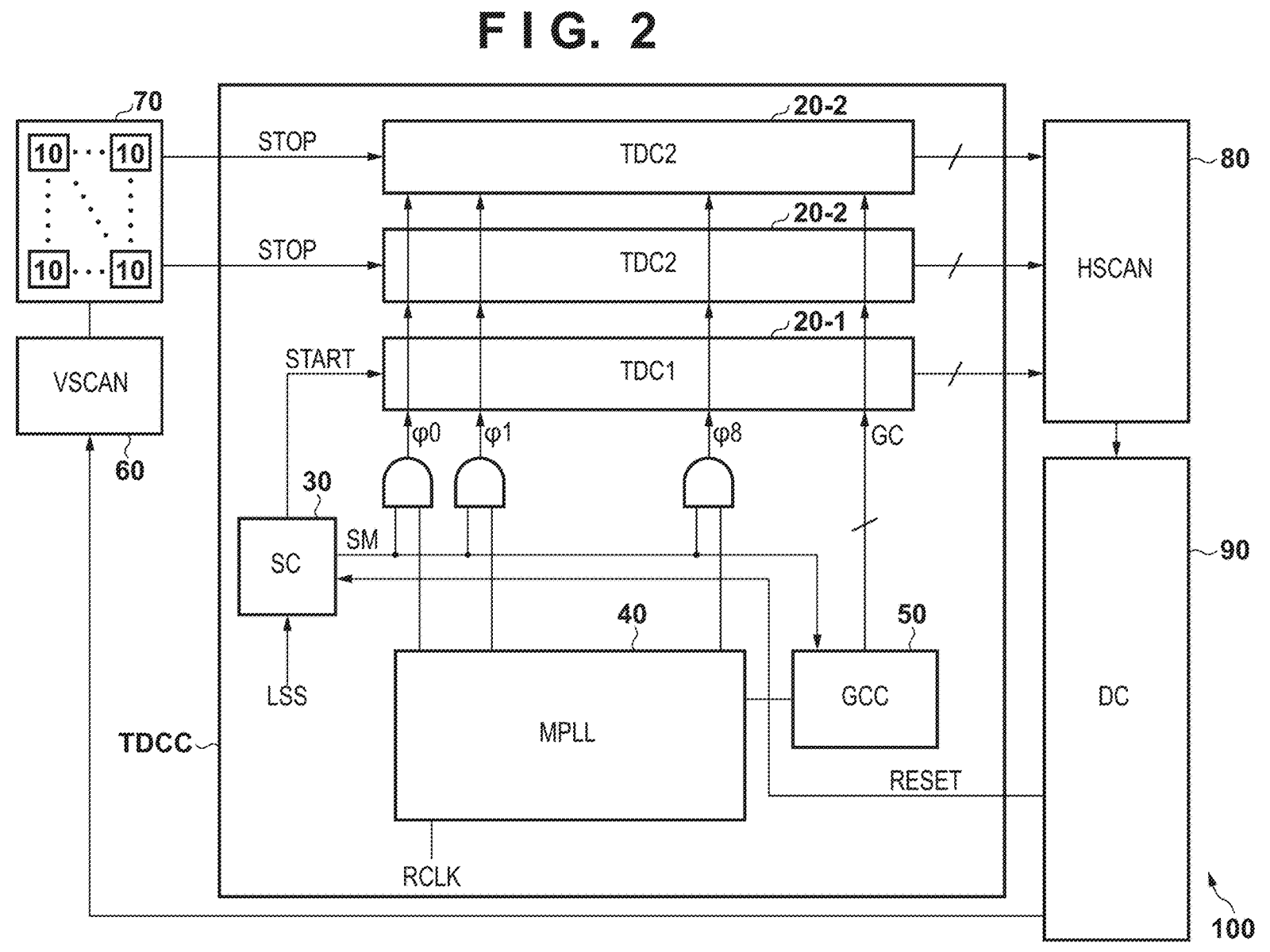

FIG. 2 is a block diagram of the distance image sensor 100. The distance image sensor 100 includes a pixel array 70 formed by a plurality of pixels 10 that are arranged to form a plurality of rows and a plurality of columns. The distance image sensor 100 can also include a time to digital converter TDCC that converts, based on signals from the plurality of pixels 10, time from light emission of the light-emitting unit 110 (activation of a start signal START) to light reception by the pixels 10 (activation of a stop signal STOP) into a digital signal.

The time to digital converter TDCC can include a first measurement block (TDC1) 20-1 and a plurality of second measurement blocks (TDC2) 20-2. The plurality of second measurement blocks 20-2 can be arranged such that each second measurement block 20-2 corresponds to one column of the pixel array 70. Here, an example in which the time to digital converter TDCC includes a plurality of second measurement blocks 20-2 will be described. However, the time to digital converter TDCC may include only one second measurement block 20-2. That is, the time to digital converter TDCC can include one or a plurality of second measurement blocks 20-2. The first measurement block 20-1 and the second measurement block 20-2 can have the same configuration, as will be described below, but may have different configurations.

The time to digital converter TDCC can include a clock generation circuit 40 that generates a multiphase clock signal (in this example, a plurality of clock signals $\phi0$ to $\phi8$). The clock generation circuit 40 can include, for example, a multiphase Phase Locked Loop (PLL) circuit. The time to digital converter TDCC can also include a code generation circuit 50 that generates a code whose value changes at the same period as the period of the multiphase clock signal generated by the clock generation circuit 40. In this example, the code generation circuit 50 includes a gray code counter that generates gray codes GC (G0 to G5). The time to digital converter TDCC can also include a start control circuit 30 that activates the start signal START and a measurement start signal SM in response to activation of the synchronization signal LSS. If the measurement start signal SM is activated, the multiphase clock signals ($\phi0$ to $\phi8$) generated by the clock generation circuit 40 are supplied to the first measurement block (TDC1) 20-1 and the plurality of second measurement blocks (TDC2) 20-2.

The distance image sensor 100 can include a digital circuit 90. The digital circuit 90 can function as a control circuit in the distance image sensor 100. The digital circuit 90 can also control, for example, activation and inactivation of a reset signal RESET. The distance image sensor 100 can include a vertical scanning circuit 60 that selects at least one row from the plurality of rows of the pixel array 70 in a predetermined order. The distance image sensor 100 can also include a horizontal scanning circuit 80 that selects output data of the first measurement block 20-1 and the plurality of second measurement blocks 20-2 in a predetermined order and provides the selected output data to the digital circuit 90. The digital circuit 90 processes the output data provided from the horizontal scanning circuit 80.

FIG. 3 is a view showing an example of the configuration of a measurement block 20 that can be used as the first measurement block 20-1 and the second measurement block 20-2. To a trigger input terminal TRIG of the measurement block 20 formed as the first measurement block 20-1, the start signal START generated by the start control circuit 30 can be given. On the other hand, to the trigger input terminal TRIG of the measurement block 20 formed as the second measurement block 20-2, the stop signal STOP output from the pixel array 70 can be given. Note that the first measurement block 20-1 and the second measurement block 20-2 may have different configurations.

The measurement block 20 can include a pulse signal generator 22, a lower TDC 23, and an upper TDC 25. In this configuration example, the measurement block 20 includes the lower TDC 23 and the upper TDC 25, but the upper TDC 25 may be removed. In the configuration of the measurement block 20 including the upper TDC 25, the measurement block 20 preferably includes a synchronization circuit 24.

The measurement block 20 may include an input circuit 21 that generates a transition detection signal DS. The input circuit 21 can activate the transition detection signal DS in response to activation of the trigger signal TRIG (the start signal START or the stop signal STOP). The pulse signal generator 22 generates a pulse signal PS in response to activation of the transition detection signal DS. The pulse signal PS transitions from an inactive state to an active state at the leading edge (first edge) and then transitions from the active state to the inactive state at the trailing edge (second edge). The pulse signal generator 22 may be understood as a differentiator that differentiates an input signal (here, the transition detection signal DS) to the pulse signal generator 22. The pulse signal generator 22 can be configured to generate the pulse signal PS by, for example, a logical operation between the transition detection signal DS and a delay signal obtained by delaying the transition detection signal DS.

The pulse signal generator 22 may generate a transition detection signal DSA by slightly delaying the transition detection signal DS such that it transitions at the same timing as activation of the pulse signal PS. Note that if the delay of the activation timing of the pulse signal PS with respect to the activation timing of the transition detection signal DS can be neglected, a transition detection signal DA may be used as the transition detection signal DSA.

The lower TDC 23 can be formed by a latch circuit that latches the multiphase clock signals φ0 to φ7 in response to the trailing edge of the pulse signal PS. Here, the latch circuit transitions from an enable state to a non-enable state at the edge where the pulse signal PS transitions from the active state to the inactive state and latches the plurality of clock signals φ0 to φ7 forming the multiphase clock signal. The lower TDC 23 generates the lower bit string of digital data (time to digital conversion result) to be output from the measurement block 20 as a lower result and outputs it. The upper TDC 25 can be formed by a latch circuit that latches, in response to activation of a timing signal TMG output from the synchronization circuit 24, the gray code GC generated by the code generation circuit 50 as a code whose value changes at the same period as the period of the multiphase clock signals φ0 to φ7. The upper TDC 25 generates the upper bit string of digital data (time to digital conversion result) to be output from the measurement block 20 as an upper result and outputs it.

The synchronization circuit 24 receives at least one of the plurality of clock signals φ0 to φ7 forming the multiphase clock signal φ, here, the clock signals φ2 and φ6 among the clock signals φ0 to φ7 as a synchronous clock signal SCLK. The synchronization circuit 24 can supply a signal (synchronized transition detection signal) synchronized by receiving the transition detection signal DSA at a timing defined by the synchronous clock signal SCLK as the timing signal TMG to the upper TDC 25. The synchronization circuit 24 can supply, for example, a signal synchronized by receiving the transition detection signal DSA at a timing decided in accordance with a signal (for example, H0 to H3 to be described later) generated by the lower TDC 23 as the timing signal TMG to the upper TDC 25.

Figure 4:
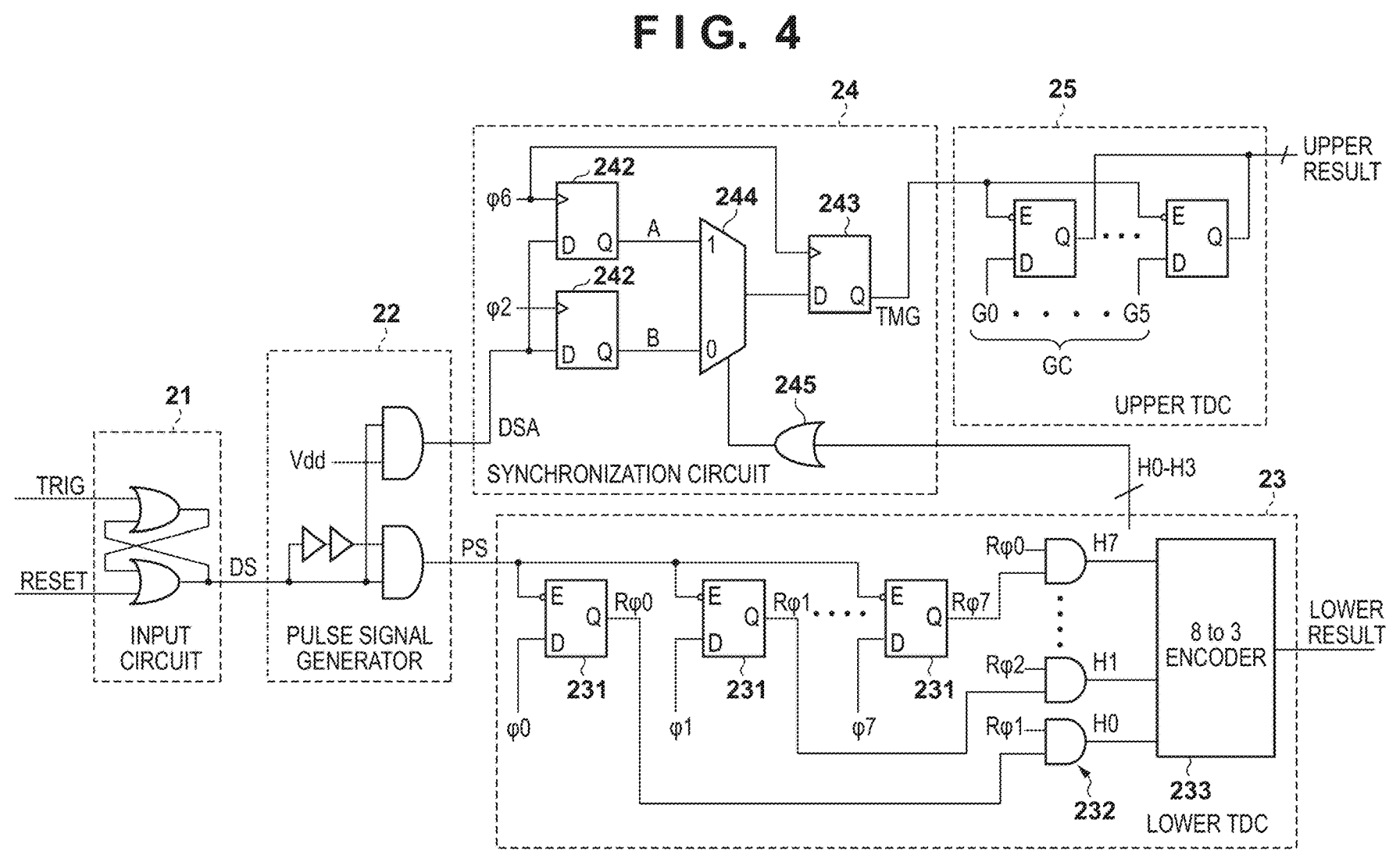

FIG. 4 is a circuit diagram showing a more detailed example of the configuration of the measurement block 20 shown in FIG. 3. FIGS. 5 and 6 are timing charts showing an example of the operation of the measurement block 20. "START@TDC1" is the start signal input to the first measurement block (TDC1) 20-1. "DSA@TDC1" is the transition detection signal DSA in the first measurement block (TDC1) 20-1. "PS@TDC1 is the pulse signal PS in the first measurement block (TDC1) 20-1. "Fine[7:0] of TDC1" is the lower result output from the lower TDC 23 of the first measurement block (TDC1) 20-1. "Coarse[5:0] of TDC1" is the upper result output from the upper TDC 25 of the first measurement block (TDC1) 20-1. "STOP from SPAD" is the stop signal input from the pixel array 70 to the second measurement block (TDC2) 20-2. "DSA@TDC2" is the transition detection signal DSA in the second measurement block (TDC2) 20-2. "PS@TDC2" is the pulse signal PS in the second measurement block (TDC2) 20-2. "Fine[7:0] of TDC2" is the lower result output from the lower TDC 23 of the second measurement block (TDC2) 20-2. "Coarse[5:0] of TDC2" is the upper result output from the upper TDC 25 of the second measurement block (TDC2) 20-2. "FF output A" is an output A of a DFF 241. "FF output B" is an output B of a DFF 242. "MUX selection output" is a selection signal input to a multiplexer 244.

The input circuit 21 is formed by, for example, an SR latch. The trigger signal TRIG can be supplied to the set terminal of the SR latch, and the reset signal RESET can be supplied to the reset terminal of the SR latch. The pulse signal generator 22 can be configured to generate the pulse signal PS by a logical operation (for example, an AND operation) between the transition detection signal DS and a delay signal obtained by delaying the transition detection signal DS by a delay device (for example, a buffer circuit).

The lower TDC 23 can include a plurality of D latches 231 that latch the plurality of clock signals φ0 to φ7 forming the multiphase clock signal, respectively, in accordance with the trailing edge of the pulse signal PS. In the example shown in FIG. 4, the pulse signal PS is a low-active pulse, and each D latch 231 includes an enable terminal E of negative logic. When the input signal (pulse signal PS) to the enable terminal E is at low level (active state), the D latch 231 is in a transmission state in which an input (multiphase clock signal) to the D terminal is transmitted. At the timing (trailing edge) when the input signal (pulse signal PS) to the enable terminal E transitions from low level (active state) to high level (inactive state), the D latch 231 changes to a latch state in which the input signal to the D terminal is latched (determined). During a period when the input signal to the enable terminal E is at high level, the D latch 231 maintains the latch state in which the latched signal is continuously output.

The D latch 231 includes an input stage (for example, a transfer gate) and a holding circuit (for example, an SR latch) at the subsequent stage. When the input to the enable terminal E is in the active state (the D latch 231 is in the transmission state), the input stage transmits the input signal (multiphase clock signal) to the D terminal to the holding circuit, and the holding circuit outputs a signal of the same level as the input signal. The multiphase clock signal that toggles at a high speed is input to the D terminal of the D latch 231. Hence, when the D latch 231 is in the transmission state, the holding circuit of the D latch 231 repetitively toggles at a high speed, and therefore, the power consumption is non-negligible. On the other hand, when the D latch 231 is in the latch state, the input stage blocks the input (multiphase clock signal) to the D terminal, and the input signal to the holding circuit does not change. Hence, when the D latch 231 is in the latch state, power consumption in the D latch 231 can be neglected.

In this embodiment, since the pulse signal PS output from the pulse signal generator 22 is supplied to the lower TDC 23 and input to the enable terminal E of the D latch 231, power consumption in the D latch 231 is reduced. This can suppress lowering of the power supply voltage caused by the power consumption in the D latch 231 and improve the time measurement accuracy.

The lower TDC 23 may be formed by a plurality of D flip-flops (DFF) that latch the plurality of clock signals φ0 to φ7 forming the multiphase clock signal, respectively, in accordance with the pulse signal PS. In this case as well, the same effect as described above can be obtained. In this case, the clock input terminal of the DFF is a terminal of positive logic.

The plurality of D latches 231 forming the latch circuit output latched data (latch data) Rφ0 to Rφ7. The lower TDC 23 can include a one-shot code generation circuit 232 and an encoder 233. The one-shot code generation circuit 232 performs a logical operation for each set of two latch data (for example, Rφ0 and Rφ1) adjacent to each other among the latch data Rφ0 to Rφ7, thereby generating one-shot codes H0 to H7 whose each bit is exclusively activated. The encoder 233 converts the one-shot codes H0 to H7 generated by the one-shot code generation circuit 232 into binary values, thereby generating a lower result. Some of the one-shot codes H0 to H7, in this example, the one-shot codes H0 to H3 are supplied even to the synchronization circuit 24.

The synchronization circuit 24 can receive the transition detection signal DSA in accordance with a clock signal (φ2 or φ6) selected from the multiphase clock signals (φ0 to φ7) based on H0 to H3 that are some of the one-shot codes H0 to H7 as the signals generated by the lower TDC 23. More specifically, the synchronization circuit 24 can select the clock signals having transition timings not overlapping the activation timing of the transition detection signal DSA from the multiphase clock signals (φ0 to φ7) based on H0 to H3 that are the signals generated by the lower TDC 23.

As a detailed example, the synchronization circuit 24 can include the DFFs 241, 242, and 243, the multiplexer 244, and an OR circuit 245. The DFF 241 latches the clock signal φ6 among the plurality of signals φ0 to φ7 forming the multiphase clock signal in accordance with the transition detection signal DS, and generates the latch output A. The DFF 242 latches the clock signal φ2 among the plurality of signals φ0 to φ7 forming the multiphase clock signal in accordance with the transition detection signal DS, and generates the latch output B. Here, φ2 and φ6 can be clock signals having a phase difference of 180° therebetween, that is, clock signals having opposite phases.

The multiplexer 244 calculates the OR of H0 to H3 that are some of the one-shot codes H0 to H7, and selects one of the latch outputs A and B in accordance with the OR. The selected latch output is a signal latched by a clock signal (a clock signal more preferable for avoiding a metastable state) having a transition timing not overlapping the activation timing of the transition detection signal DSA. The DFF 243 latches, that is, synchronizes the output of the multiplexer 244 in accordance with φ6, thereby generating the timing signal TMG. The synchronization circuit 24 can receive the transition detection signal DSA in accordance with the clock signal (φ2 or φ6) selected from the multiphase clock signals (φ0 to φ7) based on H0 to H3 that are some of the one-shot codes H0 to H7 as the signals generated by the lower TDC 23.

The upper TDC 25 latches the gray codes GC (G0 to G5) generated by the code generation circuit 50 in accordance with the timing signal TMG provided by the synchronization circuit 24.

Figure 7:
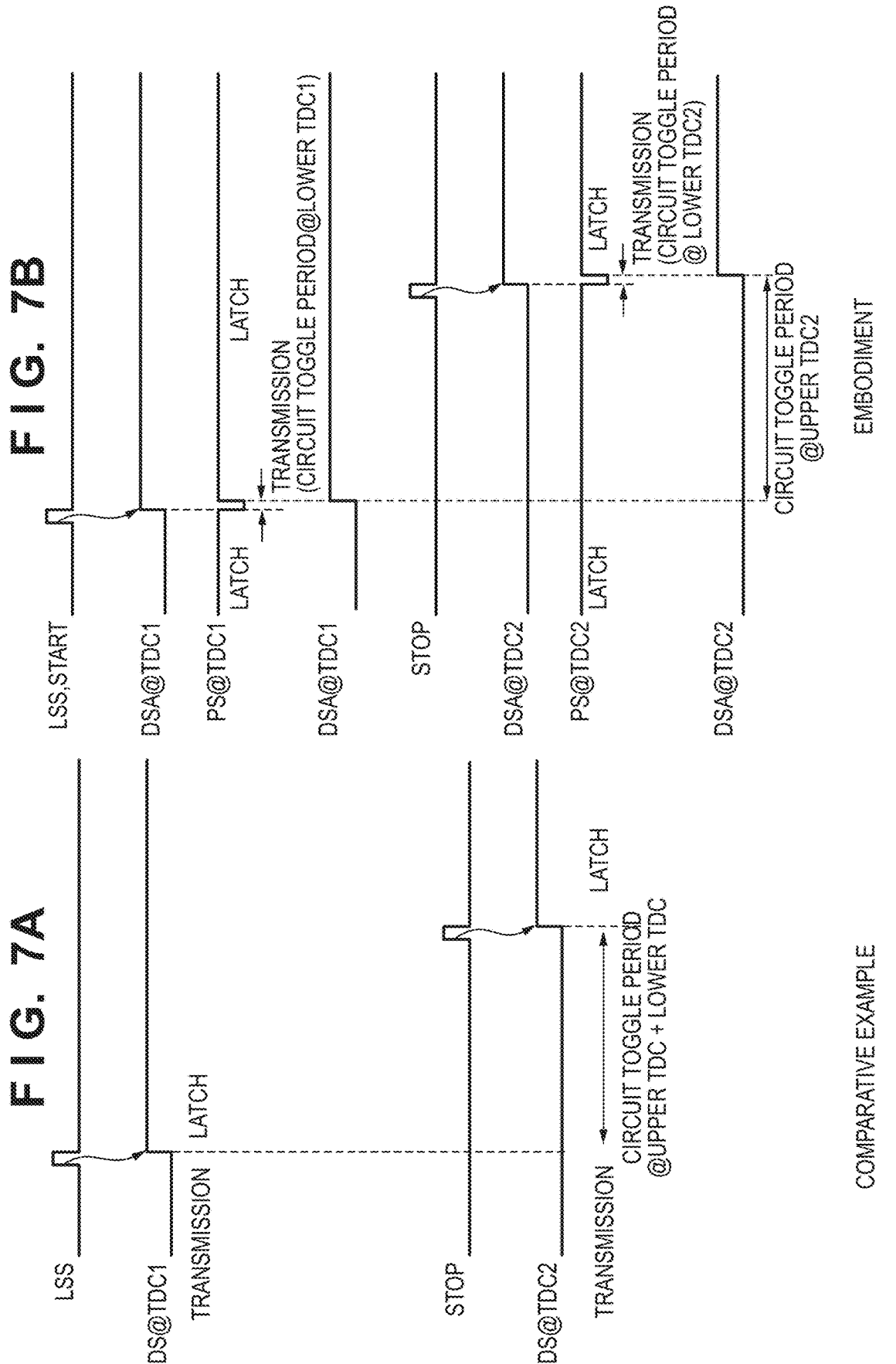
FIGS. 7A and 7B are views for explaining an operation according to a comparative example and an operation according to the embodiment.
Figure 8:
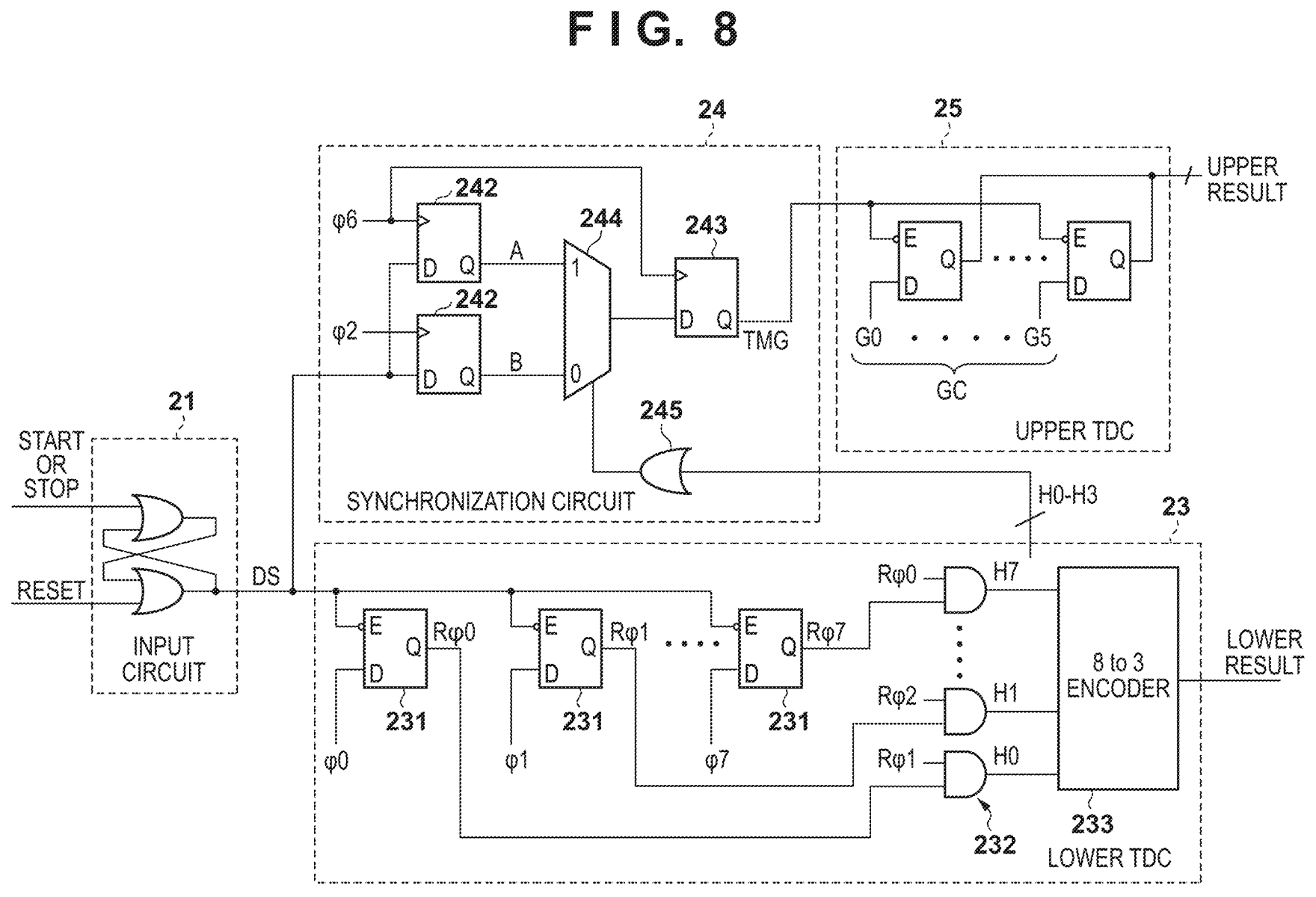

FIG. 7A is a view exemplarily showing an operation according to a comparative example, and FIG. 7B is a view exemplarily showing an operation according to this embodiment. As shown in FIG. 8, in the comparative example, the pulse signal generator 22 is removed from the configuration shown in FIG. 4, and the transition detection signal DS is provided to the lower TDC 23 and the upper TDC 25. In the comparative example, the start signal START is input to the first measurement block (TDC1), and the transition detection signal DS is provided to the lower TDC 23 and the upper TDC 25. Also, in the comparative example, the stop signal STOP is input to the second measurement block (TDC2), and the transition detection signal DS is provided to the lower TDC 23 and the upper TDC 25.

As exemplified in FIG. 7A, in the comparative example, in the second measurement block (TDC2), the transition detection signal DS is maintained in the active state for a long period from activation of the synchronization signal LSS until it is inactivated in response to the stop signal STOP. Hence, in the comparative example, since the latch circuits forming the lower TDC 23 and the upper TDC 25 toggle at a high speed in the transmission state for the long time, power consumption is large.

As exemplified in FIG. 7B, in this embodiment, in both the first measurement block (TDC1) and the second measurement block (TDC2), the pulse signal PS that is set in the active state for a short period is supplied to the latch circuits forming the lower TDC 23 and the upper TDC 25. Hence, in this embodiment, in the transmission state, the power consumption by the latch circuits forming the lower TDC 23 and the upper TDC 25 is reduced.

An example of estimation of the effect of power consumption will be described here. For example, if the time resolution is 50 ps, a toggle operation occurs at 20 GHz (=1/50 ps) in the latch circuit of each measurement block. In the comparative example, power consumption of about 0.5 mW can occur in each measurement block. In this embodiment, the power consumption can be suppressed to 0.1 mW or less.

Also, in the comparative example, if the impedance of a power supply line and a ground line is 1Ω, and a current flowing from the power supply line to the ground line via each measurement block is 0.5 A, the voltage drop in the power supply line is 0.5 V. If the nominal value of the power supply voltage is 1 V, an operation error may occur due to the voltage drop of 0.5 V. In addition, if the inductance of a bonding wire causes a voltage drop by an instantaneous current, an operation error may occur due to this as well. According to this embodiment, resistance to such an operation error is also provided.

Figure 9:
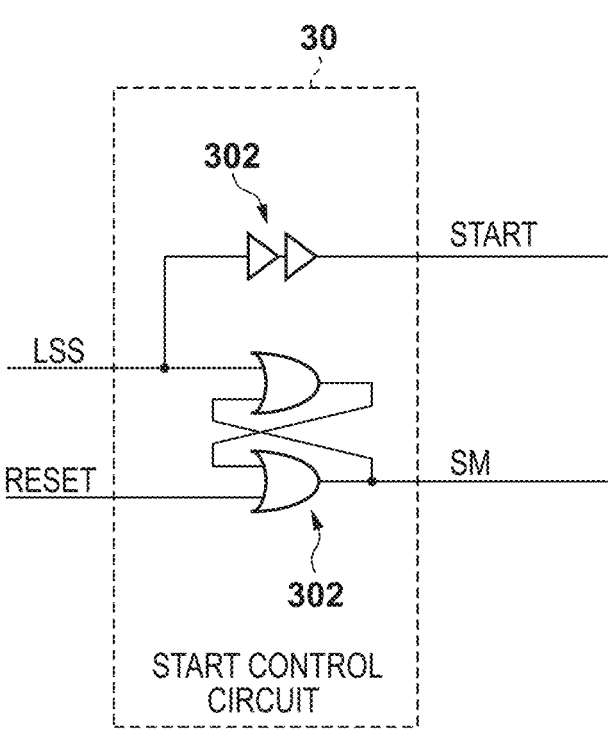
FIG. 9 is a circuit diagram showing an example of the configuration of a start control circuit.

FIG. 9 is a circuit diagram showing an example of the configuration of the start control circuit 30. The start control circuit 30 can include, for example, an SR latch 301 that activates the measurement start signal SM in response to activation of the synchronization signal LSS, and a delay circuit 302 that generates the start signal START by delaying the synchronization signal LSS. The delay circuit 302 can have the same delay time as the delay from activation of the synchronization signal LSS to activation of the measurement start signal SM in the SR latch 301.

Figure 10:
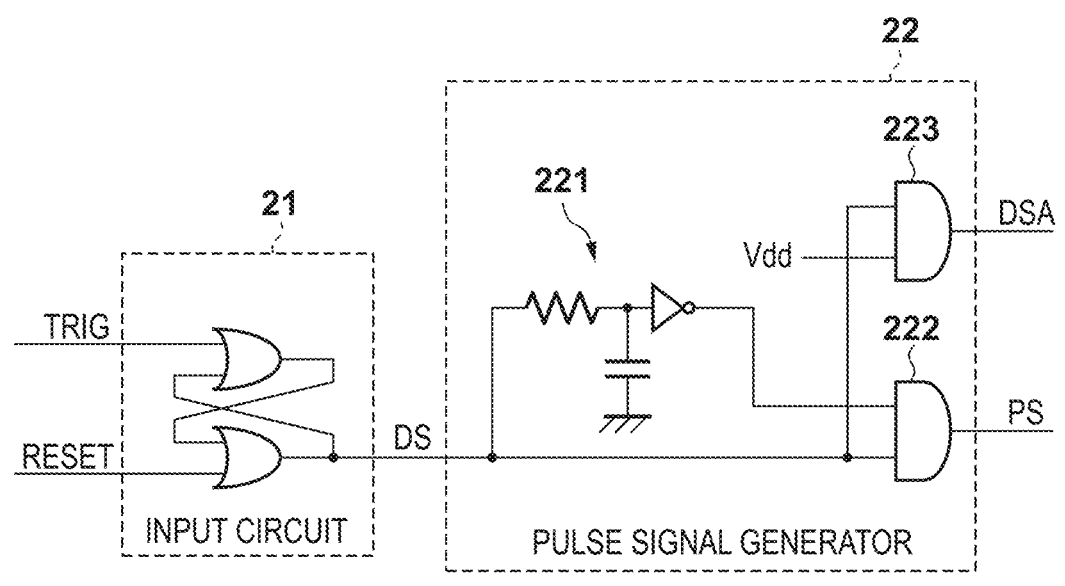
FIG. 10 is a circuit diagram showing the first modification of an input circuit and a pulse signal generation circuit in the measurement block according to the embodiment.

FIG. 10 is a view showing the first modification of the input circuit 21 and the pulse signal generator 22 of each measurement block 20. In the first modification, the pulse signal generator 22 can include a delay device 221 that delays the transition detection signal DS, and a logic circuit 222 that generates the pulse signal PS by a logical operation (for example, an OR operation) between the transition detection signal DS and the output signal of the delay device 221. The delay device 221 can include an RC circuit. The pulse signal generator 22 can include a logic circuit 223 that generates the transition detection signal DSA by slightly delaying the transition detection signal DS such that it transitions at the same timing as activation of the pulse signal PS. Note that if the delay of the activation timing of the pulse signal PS with respect to the activation timing of the transition detection signal DS can be neglected, the logic circuit 223 is unnecessary, and the transition detection signal DA may be used as the transition detection signal DSA. In the first modification, the input circuit 21 can be formed by, for example, an SR latch.

FIG. 11 is a view showing the second modification of the input circuit 21 and the pulse signal generator 22 of each measurement block 20. In the second modification, a delay device 225 generates the pulse signal PS by delaying a pulse signal as the trigger signal TRIG, and an SR latch 224 generates the transition detection signal DSA in response to the trigger signal TRIG. In the second modification, the trigger signal TRIG can be understood to be provided as the transition detection signal to the measurement block 20.

FIG. 12 is a view showing the third modification of the input circuit 21 and the pulse signal generator 22 of each measurement block 20. In the third modification, a delay device 226 generates the pulse signal PS by delaying a pulse signal as the trigger signal TRIG, and the SR latch 224 generates the transition detection signal DSA in response to the trigger signal TRIG. The delay device 226 can include, for example, a current source arranged between the power supply line and an inverter circuit, a current source arranged between the inverter circuit and the ground line, and a buffer circuit. In the third modification as well, the trigger signal TRIG can be understood to be provided as the transition detection signal to the measurement block 20.

Figure 13:
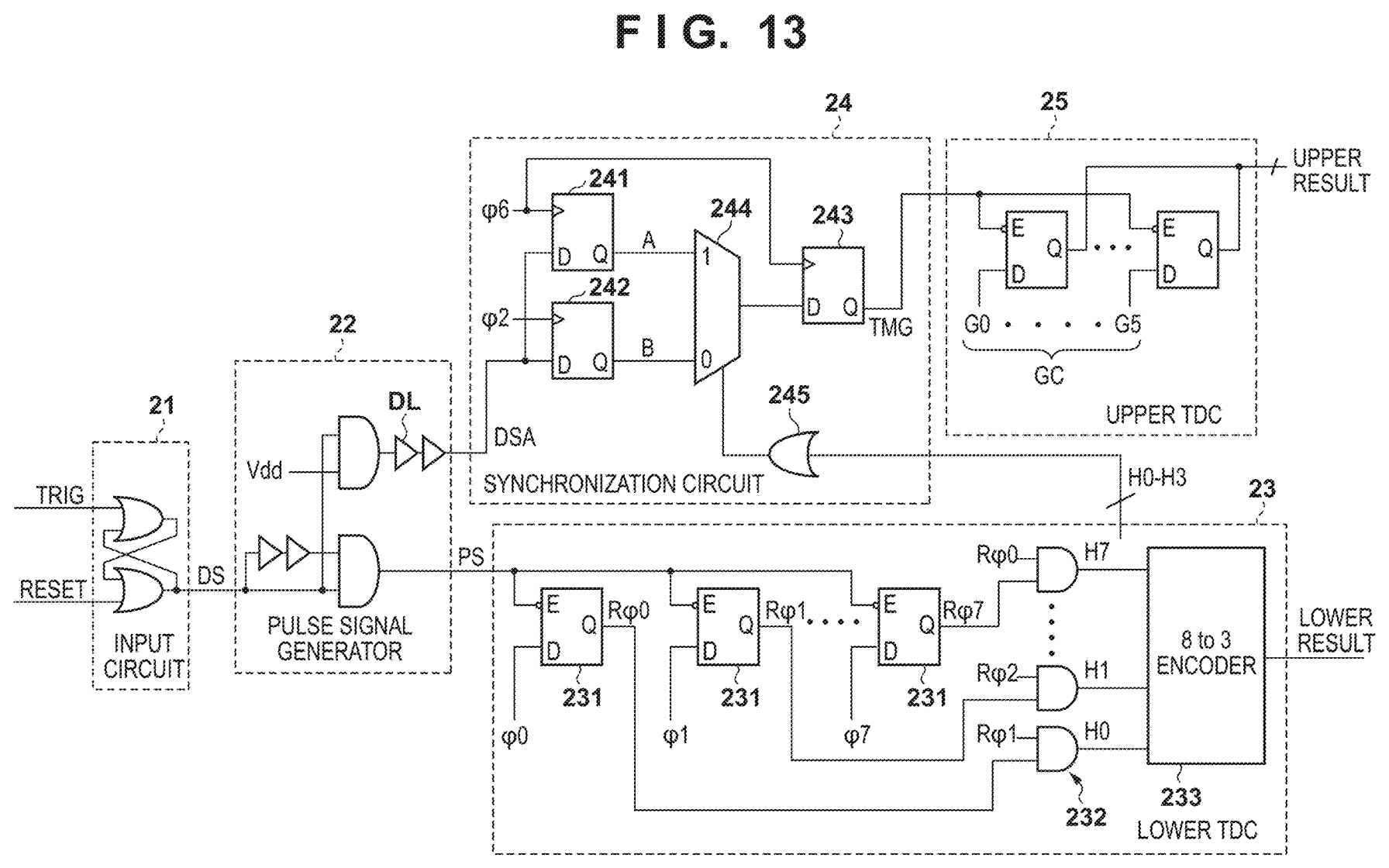

FIG. 13 is a circuit diagram showing the first improved example of the measurement block 20. In the measurement block 20 of the first improved example, the configuration of the pulse signal generator 22 is different from the pulse signal generator 22 shown in FIG. 4. In the first improved example, the pulse signal generator 22 includes a delay device DL, and the transition detection signal DS is delayed by the delay device DL and provided as the transition detection signal DSA to the synchronization circuit 24. The delay time by the delay device DL can be adjusted such that the pulse signal PS supplied to the lower TDC 23 and the transition detection signal DSA supplied to the synchronization circuit 24 correctly synchronize.

Figure 14:
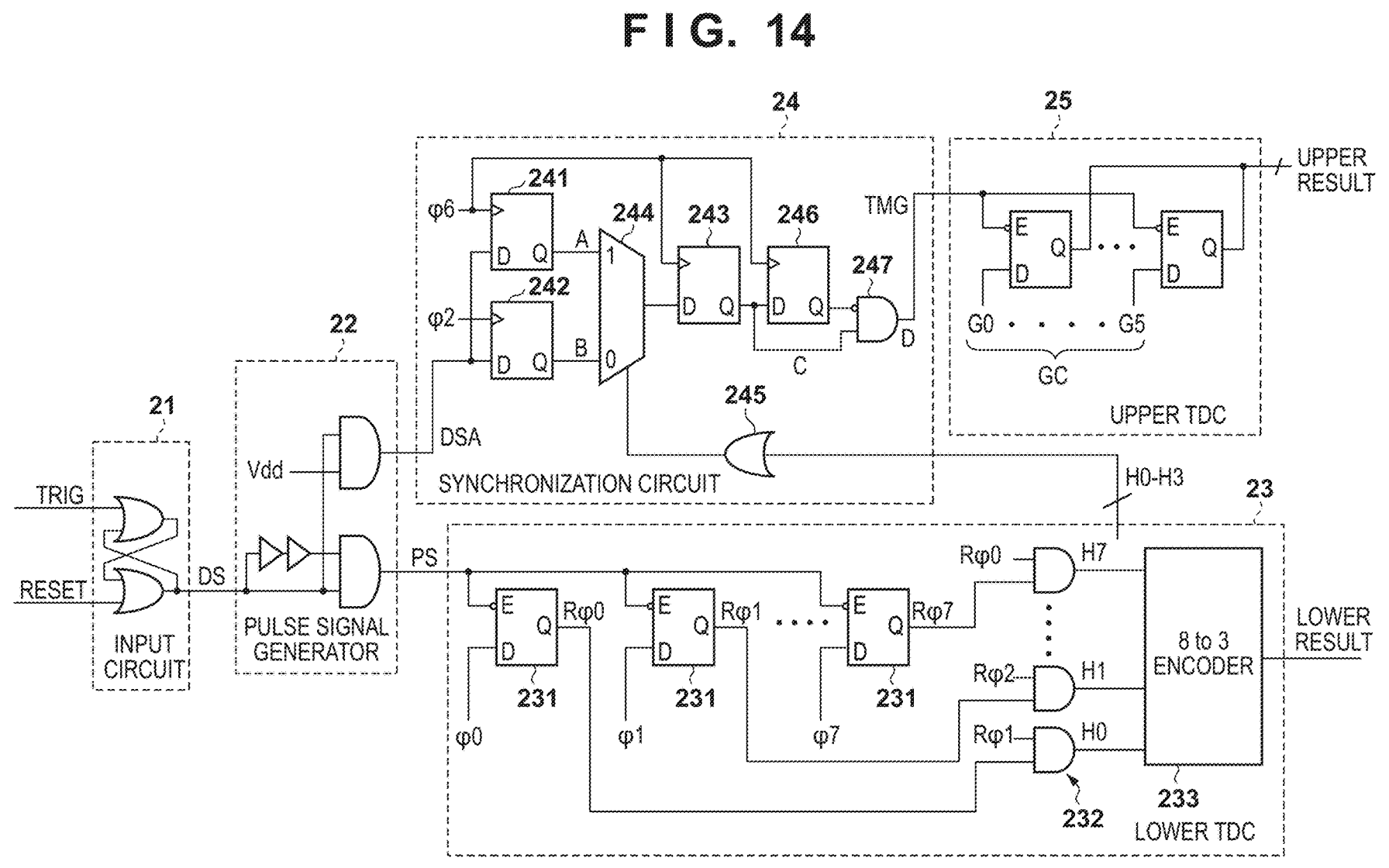

FIG. 14 is a circuit diagram showing the second improved example of the measurement block 20. In the measurement block 20 shown in FIG. 14, the configuration of the synchronization circuit 24 is different from the synchronization circuit 24 shown in FIG. 4. In the second improved example, the pulse signal generator 22 generates the pulse signal as the synchronized timing signal TMG. In the second improved example, a DFF 246 and a logic gate 247 are added to the synchronization circuit 24 shown in FIG. 4. The DFF 246 latches the output of the DFF 243 in accordance with φ6, and the logic gate 247 generates the pulsed timing signal TMG by a logical operation between the output of the DFF 243 and the output of the DFF 246.

FIG. 15 is a timing chart showing the operations of the synchronization circuit 24 and the upper TDC 25 in the measurement block 20 shown in FIG. 14. When the timing signal TMG is generated as a pulse signal, the time during which the upper TDC 25 is in the transmission state is limited to the pulse width of the pulse signal. This reduces power consumption in the upper TDC 25.

FIG. 16 is a circuit diagram showing an example of the configuration of the pixel 10. The pixel 10 includes, for example, an SPAD 11, a quench element 12, and a waveform shaping unit 13, and functions as a light-receiving unit for pulse light. The SPAD 11 generates a charge pair according to incident light by photoelectric conversion. A voltage VL (first voltage) is supplied to the anode of the SPAD 11, and a voltage VH (second voltage) higher than the voltage VL supplied to the anode is supplied to the cathode of the SPAD 11. A reverse bias voltage is applied between the anode and the cathode, and the SPAD 11 is set in an avalanche multiplication enable state. If a photon enters the SPAD 11 in the state in which the reverse bias voltage is supplied, a charge generated by the photon causes avalanche multiplication, and an avalanche current is generated.

The quench element 12 is provided between the power supply line that supplies the voltage VH and the cathode of the SPAD 11. The quench element 12 functions as a load circuit (quench circuit) at the time of signal multiplication by avalanche multiplication, and has a function of suppressing a voltage to be supplied to the SPAD 11 and suppressing avalanche multiplication (quench operation). Additionally, the quench element 12 has a function of returning the voltage to be supplied to the SPAD 11 to the voltage VH (recharge operation) by flowing a current as much as the voltage drop by the quench operation.

The waveform shaping unit 13 can function as a signal generation unit that generates a detection pulse serving as the stop signal STOP in response to an output change that occurs in the cathode of the SPAD 11 upon incidence of photons. That is, the waveform shaping unit 13 can shape the potential change of the cathode of the SPAD 11 obtained at the time of photon detection and output the STOP signal (detection pulse) of a rectangular wave. The waveform shaping unit 13 can be formed by, for example, an inverter circuit. FIG. 16 shows the waveform shaping unit 13 formed by one inverter circuit. However, the waveform shaping unit 13 may be formed by connecting a plurality of inverter circuits in series, or the waveform shaping unit 13 may be formed by another circuit having a waveform shaping effect.

FIG. 17 shows another example of the configuration of the pixel 10. In the configuration example shown in FIG. 17, the pixel 10 is an event detection type pixel. The pixel 10 can include a logarithmic response unit 410, a buffer 420, a differentiator 430, and a comparator 440. The logarithmic response unit 410 can include a photoelectric conversion element 411 and a current-voltage conversion unit 416. The photoelectric conversion element 411 can be a photodiode that does not cause avalanche multiplication. When pulse light enters, the photoelectric conversion element 411 generates a photocurrent by photoelectric conversion. The current-voltage conversion unit 416 logarithmically converts the photocurrent into a pixel voltage Vp. The current-voltage conversion unit 416 can include n-type transistors 412 and 415, a capacitor 413, and a p-type transistor 414.

The source of the n-type transistor 412 is connected to the cathode of the photoelectric conversion element 411, and the drain is connected to the power supply terminal. The p-type transistor 414 and the n-type transistor 415 are connected in series between the power supply line and the ground line. The connecting point between the p-type transistor 414 and the n-type transistor 415 is connected to the gate of the n-type transistor 412 and the input terminal of the buffer 420. The connecting point between the n-type transistor 412 and the photoelectric conversion element 411 is connected to the gate of the n-type transistor 415. A bias voltage Vb1 is applied to the gate of the p-type transistor 414. The capacitor 413 is arranged between the gate of the n-type transistor 412 and the gate of the n-type transistor 415.

The buffer 420 can include p-type transistors 421 and 422. The p-type transistors 421 and 422 are connected in series between the power supply line and the ground line. The gate of the p-type transistor 422 is connected to the logarithmic response unit 410, and the connecting point between the p-type transistors 421 and 422 is connected to the differentiator 430. A bias voltage Vb2 is applied to the gate of the p-type transistor 421.

The differentiator 430 includes a capacitor 431, p-type transistors 432 and 433, and an n-type transistor 435. The differentiator 430 may further include a capacitor 434. The p-type transistor 433 and the n-type transistor 435 are connected in series between the power supply line and the ground line. A bias voltage Vdiff is applied to the gate of the n-type transistor 435. The capacitor 431 is inserted between the buffer 420 and a gate of the p-type transistor 491. The capacitor 431 supplies, to the input terminal 491, a current according to the time differential of a pixel voltage Vp from the buffer 420. The capacitor 434 can be arranged between the gate and the drain of the p-type transistor 433, but the capacitor 434 may be omitted.

The p-type transistor 432 short-circuits the gate and the drain of the p-type transistor 433 in response to an initialization signal Trs to set a differential signal Vout to an initial value.

The comparator 440 can include a p-type transistor 441 and an n-type transistor 442. The p-type transistor 441 and the n-type transistor 442 are connected in series between the power supply line and the ground line. The gate of the p-type transistor 441 is connected to the differentiator 430. A threshold Vth is applied to the gate of the n-type transistor 442. The stop signal STOP is output from the connecting point between the p-type transistor 441 and the n-type transistor 442.

FIG. 18 shows an example of the configuration of the distance image sensor 100. In this configuration example, the distance image sensor 100 has a layered structure of a plurality of substrates. The distance image sensor 100 includes a sensor substrate (first substrate) 1 and a circuit substrate (second substrate) 2, which are stacked on each other, and the sensor substrate 1 and the circuit substrate 2 are electrically connected to each other. The distance image sensor 100 is of a back illumination type. Light enters from the first surface of the sensor substrate 1, and the circuit substrate 2 is arranged on the second surface of the sensor substrate 1. The sensor substrate 1 includes a first semiconductor layer and a first wiring structure. The circuit substrate 2 includes a second semiconductor layer and a second wiring structure. The second semiconductor layer, the second wiring structure, the first wiring structure, and the first semiconductor layer are stacked in this order, thereby forming the distance image sensor 100.

Each of the sensor substrate 1 and the circuit substrate 2 can be a diced chip, but is not limited to the chip. For example, each substrate may be a wafer. Also, each substrate may be diced after stacked in a wafer state, or after chips are formed, the chips may be stacked and joined. In the sensor substrate 1, a pixel region 1*a* including the array of the SPADs 11 of the plurality of pixels 10 is arranged. In the circuit substrate 2, a circuit region 2*a* that processes a signal detected by the pixel region 1*a* is arranged. In the circuit region 2*a*, circuits of the pixel 10 except the SPAD 11, the time to digital converter TDCC, and the like can be arranged.

Figure 19A:
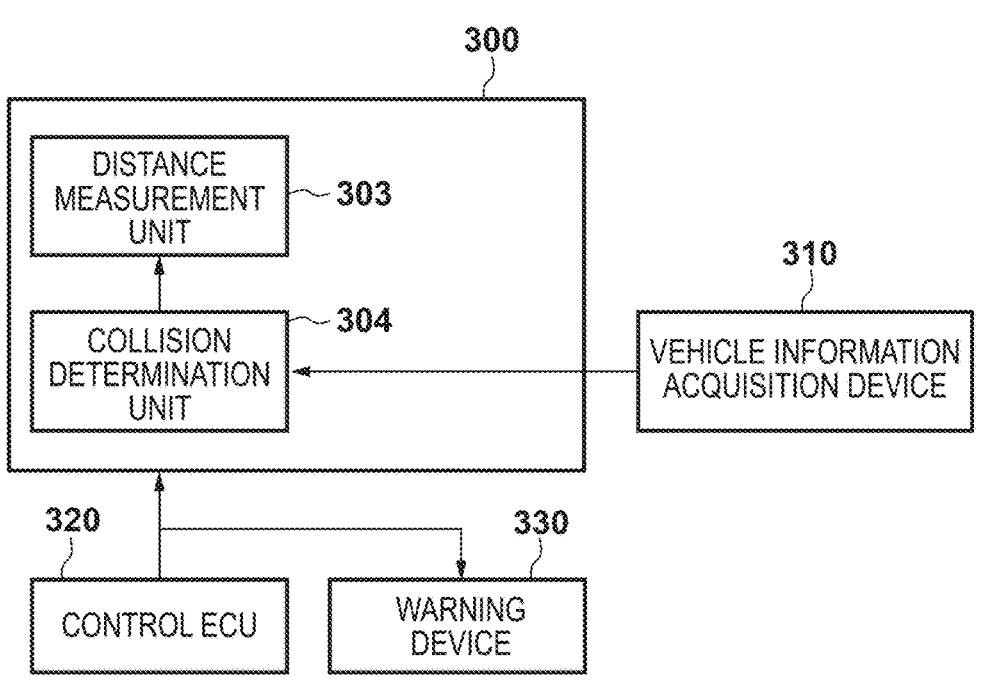
FIGS. 19A and 19B are views showing an example of the configuration of a moving body.

An application example of the distance image sensor 100 will be described below. FIG. 19A shows an example of the configuration of an apparatus mounted on a vehicle as an in-vehicle camera. An apparatus 300 includes a distance measurement unit 303 and a collision determination unit 304. The distance measurement unit 303 is formed by the above-described distance image sensor 100, and measures the distance to a target. Distance information is information about the distance to the target, and the like. The collision determination unit 304 determines, based on the distance measured by the distance measurement unit 303, whether there is collision possibility.

The apparatus 300 is connected to a vehicle information acquisition device 310 and can acquire vehicle information such as a vehicle speed, a yaw rate, and a steering angle. Also, a control ECU 320 that is a control device configured to output, based on the determination result of the collision determination unit 304, a control signal for generating a braking force to the vehicle is connected to the apparatus 300. The apparatus 300 is also connected to a warning device 330 that generates a warning to the driver based on the determination result of the collision determination unit 304. For example, if collision possibility is high as the determination result of the collision determination unit 304, the control ECU 320 instructs the vehicle to actuate a brake, stop acceleration, and suppress the engine output, thereby avoiding collision and reducing damage. The warning device 330 issues a warning to the user via the output of a warning such as a sound, display of warning information on the screen of a car navigation system or the like, or the vibration of a seat belt and steering wheel. These devices of the apparatus 300 function as a moving body control unit that controls the operation of controlling the vehicle, as described above.

Figure 19B:
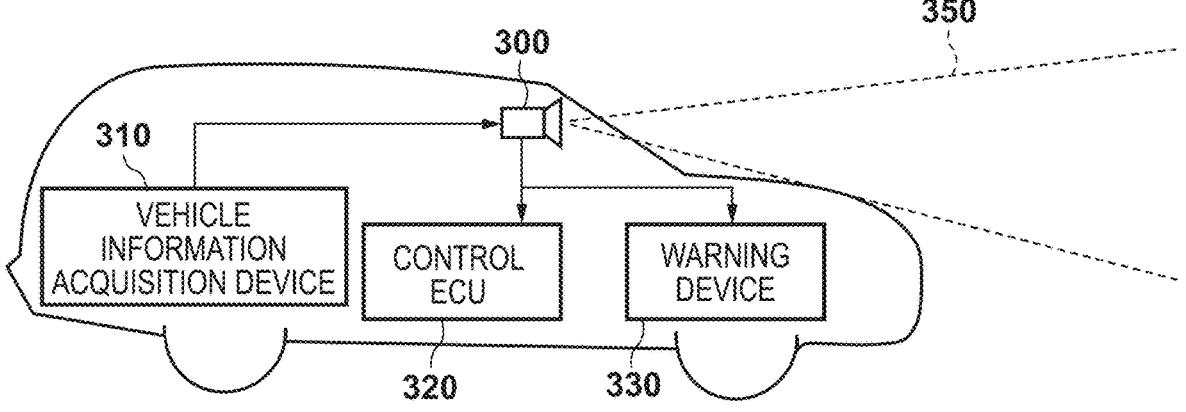

In this embodiment, the apparatus 300 performs distance measurement on the periphery, for example, on the front or rear side of the vehicle. FIG. 19B shows the apparatus in a case where distance measurement is performed on the front side of the vehicle (distance measurement range 350). The vehicle information acquisition device 310 serving as a distance measurement control means sends an instruction to the apparatus 300 or the distance measurement unit 303 to perform a distance measurement operation. With this configuration, the accuracy of distance measurement can further be improved.

Control of avoiding collision with another vehicle has been described above. However, this embodiment can also be applied to control of performing automated driving following another vehicle and control of performing automated driving while preventing deviation from a lane. Furthermore, the apparatus can be applied not only to a vehicle such as an automobile but also to, for example, a moving body (moving device) such as a ship, an aircraft, an artificial satellite, an industrial robot, or a consumer robot. In addition, the apparatus can be applied not only to the moving body but also to an apparatus that widely uses object recognition or biometric recognition, such as an intelligent transport system (ITS) or a monitoring system.

The present invention is not limited to the above embodiments and various changes and modifications can be made within the spirit and scope of the present invention. Therefore, to apprise the public of the scope of the present invention, the following claims are made.

According to the present disclosure, a technique advantageous in reducing the power consumption of a latch circuit in a time to digital converter is provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-173156, filed Oct. 4, 2023 which is hereby incorporated by reference herein in its entirety.

What is claimed is:

1. A time to digital conversion circuit comprising:
a pulse signal generator configured to generate a pulse signal in response to activation of a transition detection signal;
a latch circuit configured to latch a multiphase clock signal in response to a trailing edge of the pulse signal;
an upper time to digital converter (TDC) configured to latch, in response to activation of a timing signal, a code whose value changes at the same period as a period of the multiphase clock signal; and
a synchronization circuit,
wherein the latch circuit forms a lower TDC, and
the synchronization circuit supplies a signal synchronized by receiving the transition detection signal at a timing decided in accordance with a signal generated by the lower TDC as the timing signal to the upper TDC.

2. The circuit according to claim 1, further comprising an input circuit configured to activate the transition detection signal in response to activation of a trigger signal.

3. The circuit according to claim 2, wherein the input circuit includes an SR latch.

4. The circuit according to claim 1, wherein the latch circuit includes a plurality of D latches that latch a plurality of clock signals forming the multiphase clock signal.

5. The circuit according to claim 1, wherein the latch circuit includes a plurality of D flip-flops that latch a plurality of clock signals forming the multiphase clock signal.

6. The circuit according to claim 1, wherein the pulse signal generator generates the pulse signal by a logical operation between the transition detection signal and a delay signal obtained by delaying the transition detection signal.

7. The circuit according to claim 1, wherein the synchronization circuit receives the transition detection signal in accordance with a clock signal selected from a plurality of clock signals forming the multiphase clock signal based on the signal generated by the lower TDC.

8. The circuit according to claim 7, wherein the synchronization circuit selects a clock signal having a transition timing not overlapping an activation timing of the transition detection signal from the plurality of clock signals forming the multiphase clock signal based on the signal generated by the lower TDC.

9. The circuit according to claim 1, wherein the transition detection signal is supplied to the synchronization circuit via a delay device.

10. The circuit according to claim 1, wherein the synchronization circuit generates a pulse signal as the synchronized signal.

11. A time to digital converter comprising:
a first time to digital conversion circuit having the same configuration as a time to digital conversion circuit defined in claim 1 and configured to receive a start signal as a trigger signal;
a second time to digital conversion circuit having the same configuration as the time to digital conversion circuit defined in claim 1 and configured to receive a stop signal as a trigger signal;
a clock generation circuit configured to supply a multiphase clock signal to the first time to digital conversion circuit and the second time to digital conversion circuit; and
a code generation circuit configured to supply a code whose value changes at the same period as a period of the multiphase clock signal to the first time to digital conversion circuit and the second time to digital conversion circuit.

12. A distance measuring device comprising:
a pixel array including a plurality of pixels; and
a time to digital converter defined in claim 11,
wherein a second time to digital conversion circuit of the time to digital converter receives a stop signal from the pixel array.

13. The device according to claim 12, wherein each of the plurality of pixels includes an avalanche photodiode.

14. The device according to claim 12, wherein each of the plurality of pixels includes an event detection type pixel.

15. The device according to claim 12, further comprising a light-emitting unit; and
a control unit configured to send a synchronization signal to the light-emitting unit and the time to digital conversion circuit.

16. A moving body comprising:
a distance measuring device defined in claim 12; and
a control unit configured to control the moving body based on an output of the distance measuring device.

* * * * *